US007698434B2

(12) United States Patent
June et al.

(10) Patent No.: US 7,698,434 B2
(45) Date of Patent: Apr. 13, 2010

(54) J2EE CONNECTOR ARCHITECTURE

(75) Inventors: Deborah C. June, Groton, MA (US); Brian Chesebro, Londonderry, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 10/248,744

(22) Filed: Feb. 13, 2003

(65) Prior Publication Data

US 2004/0045008 A1 Mar. 4, 2004

Related U.S. Application Data

(60) Provisional application No. 60/406,745, filed on Aug. 29, 2002.

(51) Int. Cl.
*G06F 15/16* (2006.01)

(52) U.S. Cl. .................. 709/227; 719/319; 709/223

(58) Field of Classification Search ............... 718/105, 718/104; 709/223, 224, 227, 228; 707/1, 707/10

See application file for complete search history.

(56) References Cited

U.S. PATENT DOCUMENTS

| 4,714,996 | A | | 12/1987 | Gladney |
|---|---|---|---|---|
| 5,163,148 | A | | 11/1992 | Walls |
| 5,212,793 | A | | 5/1993 | Donica et al. ............... 395/700 |
| 5,249,290 | A | | 9/1993 | Heizer ........................ 395/650 |
| 5,553,242 | A | * | 9/1996 | Russell et al. ............... 709/227 |
| 5,586,260 | A | | 12/1996 | Hu |
| 5,613,060 | A | | 3/1997 | Britton ........................ 714/15 |
| 5,682,478 | A | * | 10/1997 | Watson et al. ............... 709/229 |
| 5,748,975 | A | | 5/1998 | Van De Vanter |
| 5,751,967 | A | | 5/1998 | Raab et al. |
| 5,761,507 | A | | 6/1998 | Govett ........................ 395/684 |
| 5,765,171 | A | | 6/1998 | Gehani ........................ 707/203 |
| 5,768,504 | A | | 6/1998 | Kells et al. ............. 395/187.01 |
| 5,774,689 | A | | 6/1998 | Curtis et al. ................. 395/500 |
| 5,799,173 | A | * | 8/1998 | Gossler et al. ................. 703/21 |
| 5,802,291 | A | | 9/1998 | Balick et al. ............ 395/200.32 |
| 5,805,798 | A | | 9/1998 | Kearns |
| 5,819,107 | A | | 10/1998 | Lichtman et al. ............ 395/828 |
| 5,835,769 | A | | 11/1998 | Jervis et al. |
| 5,836,014 | A | | 11/1998 | Faiman |
| 5,894,554 | A | * | 4/1999 | Lowery et al. ............... 709/203 |
| 5,909,689 | A | | 6/1999 | Van Ryzin |
| 5,910,180 | A | | 6/1999 | Flory et al. .................. 709/301 |
| 5,926,775 | A | | 7/1999 | Brumley et al. ............. 702/127 |

(Continued)

OTHER PUBLICATIONS

H. Bergsten, "Improved Performance with a Connection Pool", Sep. 1999, www.webdevelpoperjournal.com.*

(Continued)

*Primary Examiner*—Diem K Cao
(74) *Attorney, Agent, or Firm*—Fliesler Meyer LLP

(57) ABSTRACT

A connector architecture implementation that is J2EE compliant and provides improved connection management capabilities. The connector architecture implementation provides a connector leak detection mechanism that detects connection leaks both automatically and manually. The connector architecture implementation pre-configures and manages the growth and reduction of a connection pool. The connector architecture implementation may be pre-configured by pre-populating the connection pool. Connection pool growth may be managed by generating connections in response to connection requests. A connection pool may also be configured to reduce the number of connections in the pool. The number of connections may be reduced if the connection demand decreases. Password credentials allowing access to services are used to provide additional connection management.

17 Claims, 7 Drawing Sheets

U.S. PATENT DOCUMENTS

| | | | |
|---|---|---|---|
| 5,933,838 A | 8/1999 | Lomet | 707/202 |
| 6,018,805 A | 1/2000 | Ma et al. | |
| 6,023,722 A | 2/2000 | Colyer | 709/201 |
| 6,044,217 A | 3/2000 | Brealey et al. | |
| 6,055,243 A | 4/2000 | Vincent et al. | 370/466 |
| 6,105,067 A * | 8/2000 | Batra | 709/227 |
| 6,122,629 A | 9/2000 | Walker | 707/8 |
| 6,134,673 A | 10/2000 | Chrabaszcz | |
| 6,173,327 B1 | 1/2001 | De Borst et al. | 709/231 |
| 6,182,109 B1 * | 1/2001 | Sharma et al. | 718/104 |
| 6,189,046 B1 | 2/2001 | Moore et al. | 709/315 |
| 6,212,521 B1 | 4/2001 | Minami | |
| 6,212,556 B1 | 4/2001 | Arunachalam | 709/219 |
| 6,243,753 B1 | 6/2001 | Machin et al. | 709/227 |
| 6,269,373 B1 | 7/2001 | Apte et al. | 707/10 |
| 6,304,879 B1 | 10/2001 | Sobeski | |
| 6,338,089 B1 | 1/2002 | Quinlan | 709/227 |
| 6,343,287 B1 | 1/2002 | Kumar et al. | 707/4 |
| 6,353,923 B1 | 3/2002 | Bogle et al. | |
| 6,356,931 B2 | 3/2002 | Ismael et al. | |
| 6,389,462 B1 | 5/2002 | Cohen | 709/218 |
| 6,411,956 B1 | 6/2002 | Ng | 707/10 |
| 6,425,005 B1 | 7/2002 | Dugan | 709/223 |
| 6,430,564 B1 | 8/2002 | Judge | |
| 6,438,705 B1 | 8/2002 | Chao et al. | |
| 6,453,321 B1 | 9/2002 | Hill | |
| 6,453,356 B1 | 9/2002 | Sheard et al. | 709/231 |
| 6,463,503 B1 | 10/2002 | Jones et al. | 711/114 |
| 6,466,972 B1 | 10/2002 | Paul et al. | 709/222 |
| 6,505,200 B1 | 1/2003 | Ims et al. | |
| 6,505,241 B2 | 1/2003 | Pitts | 709/218 |
| 6,523,130 B1 | 2/2003 | Hickman et al. | |
| 6,539,381 B1 | 3/2003 | Prasad et al. | |
| 6,542,845 B1 | 4/2003 | Grucci et al. | 702/122 |
| 6,567,809 B2 | 5/2003 | Santosuosso | |
| 6,651,140 B1 | 11/2003 | Kumar | |
| 6,687,848 B1 | 2/2004 | Najmi | 714/4 |
| 6,721,777 B1 | 4/2004 | Sharma | |
| 6,732,237 B1 | 5/2004 | Jacobs et al. | |
| 6,757,708 B1 | 6/2004 | Craig et al. | |
| 6,766,324 B2 | 7/2004 | Carlson | |
| 6,775,703 B1 | 8/2004 | Burns | 709/228 |
| 6,779,017 B1 | 8/2004 | Lamberton | |
| 6,804,686 B1 | 10/2004 | Stone et al. | |
| 6,826,601 B2 | 11/2004 | Jacobs | 709/217 |
| 6,832,238 B1 | 12/2004 | Sharma | |
| 6,836,889 B1 | 12/2004 | Chan | |
| 6,854,120 B1 | 2/2005 | Lo | |
| 6,898,587 B2 | 5/2005 | Messinger | |
| 6,944,785 B2 | 9/2005 | Gadir et al. | |
| 6,963,857 B1 | 11/2005 | Johnson | |
| 6,983,465 B2 | 1/2006 | Mandal et al. | |
| 7,089,584 B1 | 8/2006 | Sharma | |
| 7,100,195 B1 | 8/2006 | Underwood | |
| 7,171,692 B1 | 1/2007 | DeMello | |
| 7,203,756 B2 * | 4/2007 | Tapperson | 709/227 |
| 7,240,101 B2 | 7/2007 | Rich | |
| 7,454,492 B2 | 11/2008 | Bauer et al. | |
| 7,484,224 B2 | 1/2009 | Potter et al. | |
| 7,506,342 B2 | 3/2009 | Mousseau et al. | |
| 7,546,606 B2 | 6/2009 | Upton | |
| 2001/0042073 A1 | 11/2001 | Saether et al. | |
| 2002/0073188 A1 | 6/2002 | Rawson | |
| 2002/0107934 A1 | 8/2002 | Lowery | |
| 2002/0147961 A1 | 10/2002 | Charters | |
| 2002/0161839 A1 | 10/2002 | Colasurdo | |
| 2002/0161860 A1 * | 10/2002 | Godlin et al. | 709/219 |
| 2002/0184444 A1 | 12/2002 | Shandony | |
| 2002/0188591 A1 | 12/2002 | Santosuosso | |
| 2003/0018732 A1 | 1/2003 | Jacobs | |
| 2003/0037181 A1 | 2/2003 | Freed | |
| 2003/0041135 A1 | 2/2003 | Keyes et al. | |
| 2003/0060214 A1 | 3/2003 | Hendrey et al. | |
| 2003/0065826 A1 | 4/2003 | Skufca | |
| 2003/0105837 A1 | 6/2003 | Kamen | |
| 2003/0110467 A1 | 6/2003 | Balakrishnan | |
| 2003/0233433 A1 | 12/2003 | Halpern | |
| 2003/0233631 A1 | 12/2003 | Curry et al. | |
| 2003/0236923 A1 | 12/2003 | Jeyaraman | |
| 2004/0059735 A1 | 3/2004 | Gold et al. | |
| 2004/0068568 A1 | 4/2004 | Griffin et al. | |
| 2004/0153558 A1 | 8/2004 | Gunduc et al. | |
| 2004/0230747 A1 | 11/2004 | Ims et al. | |
| 2006/0080435 A1 | 4/2006 | Tankov et al. | |
| 2006/0168118 A1 | 7/2006 | Godlin et al. | |
| 2006/0212453 A1 | 9/2006 | Eshel et al. | |
| 2008/0270600 A1 | 10/2008 | Tankov et al. | |

OTHER PUBLICATIONS (no name) "Database Connection Pool Management", IBM TDB, Dec. 1998.*
A.Thomas, Selecting Enterprise JavaBeans Techonology, Jul. 1998, Patricia Seybold Group.*
BEA System, WebLogic Server 6.1, Sep. 13, 2001.*
Visveswaran, Dive into connection pooling with J2EE, Oct. 2001, pp. 1-7.*
Bea Systems, Connection Management, 2001, pp. 1-3.*
Bea Systems, WebLogic 6.1—About this Document, Bea Systems, 2001, pp. 1-4.*
BEA Systems, BEA WebLogic Server—Programming WebLogic J2EE Connectors, Release 7.0, Bea Systems, Inc, Aug. 20, 2002, pp. 1-119.*
BEA Systems, BEA WebLogic Server 6.1, Bea Systems, Jun. 24, 2002, pp. 1-113.*
Mohan, C. et al. "ARIES: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.
Mariucci, Marcello. *Enterprise Application Server Development Environmens*, Overview, University of Stuttgart, Oct. 10, 2000, pp. 1-10.
Sun Microsystems, *IPlanet Application Server 6.0 White Paper*, Technical Reference Guide, May 25, 2000.
Roman, Ed and Rickard Oberg, *The Technical Benefits of EJB and J2EE Technologies over COM+ and Windows DNA*, Dec. 1999, pp. 1-24.
Hewlett-Packart, *HP Application Server Technical Guide Version 8.0*, 1999-2001.
Duvos, Enrique and Azer Bestavros, *An Infrastructure for the Dynamic Distribution of Web Applications and Services*, Department of Computer Science, Boston University, Dec. 2000, pp. 1-22.
Lauer, C., *Introducing Microsoft.net*, http:web.archive.org/web/20020702162429/http:www.freevbcode.com/ShowCode. asp?ID=2171 (Jul. 2, 2002).
Kooijmans, Enterprise JavaBeans for z/OS and OS/390 WebSphere Application Server V4.0; 2001, p. 31-78, 185-240.
Bainbridge, "CICS and Enterprise JavaBeans," 2001, v. 40, No. 1, p. 1-19.
Stearns, B., "Using the J2EE Connector Architecture Common Client Interface," Sun Systems, Apr. 2001, pp. 1-10.
Marinescu, F., "BEA Weblogic Server 6.1 has been released," TheServerSide.com, p. 1.
Flowers, B., "The J2EE Connector Architecture," Sys-Con Media, May 1, 2001, pp. 1-4.
Rana, A., et al., "Java Junction," Intelligent Enterprise, Apr. 16, 2001, pp. 1-9.
Stanhope, J., "J2EE Connector Architecture Promises to Simplify Connection to Back-End Systems," Giga Information Group, Nov. 16, 2000, pp. 1-4.
Sarathy, V., et al., "Integrating Java Applications with the Enterprise," EAI Journal, May 2001, pp. 50-55.
Rodoni, J., "The J2EE Connector Architecture's Resource Adapter," Sun Systems, Dec. 2001, pp. 1-12.

BEA Systems, WebLogic Server 6.1, Sep. 15, 2001.
Gamma, E., al., "Design Patterns Elements of Reusable Object-Oriented Software," Addison-Wesley Publishing Company, 1998, pp. 293-303.

Sun Microsystems, Enterprise JavaBeans™ Specification, Version 2.0, Aug. 14, 2001.

* cited by examiner

J2EE CONNECTOR ARCHITECTURE

CLAIM OF PRIORITY AND CROSS REFERENCE TO RELATED APPLICATIONS

The present application claims the benefit of priority under 35 U.S.C. §119(e) to U.S. Provisional Patent Application entitled "IMPROVED J2EE CONNECTOR ARCHITECTURE", application Ser. No. 60/406,745, filed on Aug. 29, 2002, which application is incorporated herein by reference. The current application hereby incorporates by reference the material in the following patent applications: U.S. patent application Ser. No. 60/354,738, entitled "J2EE COMPONENT EXTENSION ARCHITECTURE," filed Feb. 6, 2002; and U.S. patent application Ser. No. 60/397,916, entitled "SYSTEM AND METHOD FOR IMPLEMENTING J2EE CONNECTOR ARCHITECTURE," filed Jul. 23, 2002.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

1. Field of the Invention

The current invention relates generally to connector architectures, and more particularly to a J2EE connector architecture for managing resource adapters.

2. Background

The Java™ 2 Platform, Enterprise Edition (J2EE), from Sun Microsystems, Inc. of Palo Alto, Calif., defines a standard for developing multi-tier enterprise applications. A J2EE Connector Architecture is useful for the integration of J2EE-compliant application servers with at least one enterprise information system (EIS). There are typically two parts to this architecture: an EIS vendor-provided resource adapter and an application server to which the resource adapter plugs in. The J2EE Connector Architecture also defines a common client interface (CCI) that can be used to access an EIS. A CCI defines a client API for interacting with heterogeneous EIS systems, which enables application components and Enterprise Application Integration (EAI) frameworks to drive interactions across heterogeneous EIS systems using a common client API.

A resource adapter is a segment of code that represents an Enterprise Information System (EIS). More specifically, a resource adaptor is a system-level software driver used by an application server, such as WebLogic Server, to connect to an enterprise information system (EIS). A resource adapter serves as the "J2EE connector." The connector architecture implementation supports resource adapters developed by EIS vendors and third-party application developers that can be deployed in any application server supporting the Sun Microsystems J2EE Platform Specification, Version 1.3. Resource adapters contain the Java, and if necessary, the native components required to interact with the EIS.

J2EE Connector Architecture is an architecture for integrating J2EE-compliant application servers with enterprise information systems (EIS). There are two parts to this architecture: an EIS vendor-provided resource adapter and an application server, such as WebLogic Server, by BEA Systems of San Jose, Calif., to which the resource adapter plugs in. This architecture defines a set of contracts, such as transactions, security, and connection management, that both the resource adapter and application server need to support to communicate with one another. The J2EE Connector Architecture also defines a Common Client Interface (CCI) for EIS access. The CCI defines a client API for interacting with heterogeneous EIS's.

What is needed is an improved connector architecture implementation system that is more efficient and allows an administrator to monitor and make changes to connections within the application server as needed.

SUMMARY OF INVENTION

A connector architecture implementation is provided that includes advantageous features in connection management as well as other areas. In one embodiment of the present invention, connector leaks may be detected both automatically and manually. Connection pools for an EIS may be configured to more efficiently fulfill connection requests. In one embodiment, connection pools are pre-populated when the application server starts up. In another embodiment, connection pools that experience reduced usage are decreased in size. Managed connections may be recycled to fulfill connection requests. In another embodiment, managed connections may be monitored by an administrator. A user may monitor connections such as leaking connections and idle connections and delete connections as needed.

DETAILED DESCRIPTION

A connector architecture implementation is provided that is J2EE compliant and provides improved connection management capabilities. In one embodiment of the present invention, the connector architecture implementation provides a connector leak detection mechanism. The connector leak detector may detect connection leaks both automatically and manually. In another embodiment of the present invention, the connector architecture implementation is operable to pre-configure a connection pool and manage the growth and reduction of a connection pool. The connector architecture implementation may be pre-configured by pre-populating the connection pool. Connection pool growth may be managed by connections that are created in response to connection requests. A connection pool in the present invention may also be configured to reduce the number of connections in the pool. In one embodiment, the number of connections is reduced if the connection demand decreases. Password credentials allowing access to services are used to provide additional connection management.

Figure 1:
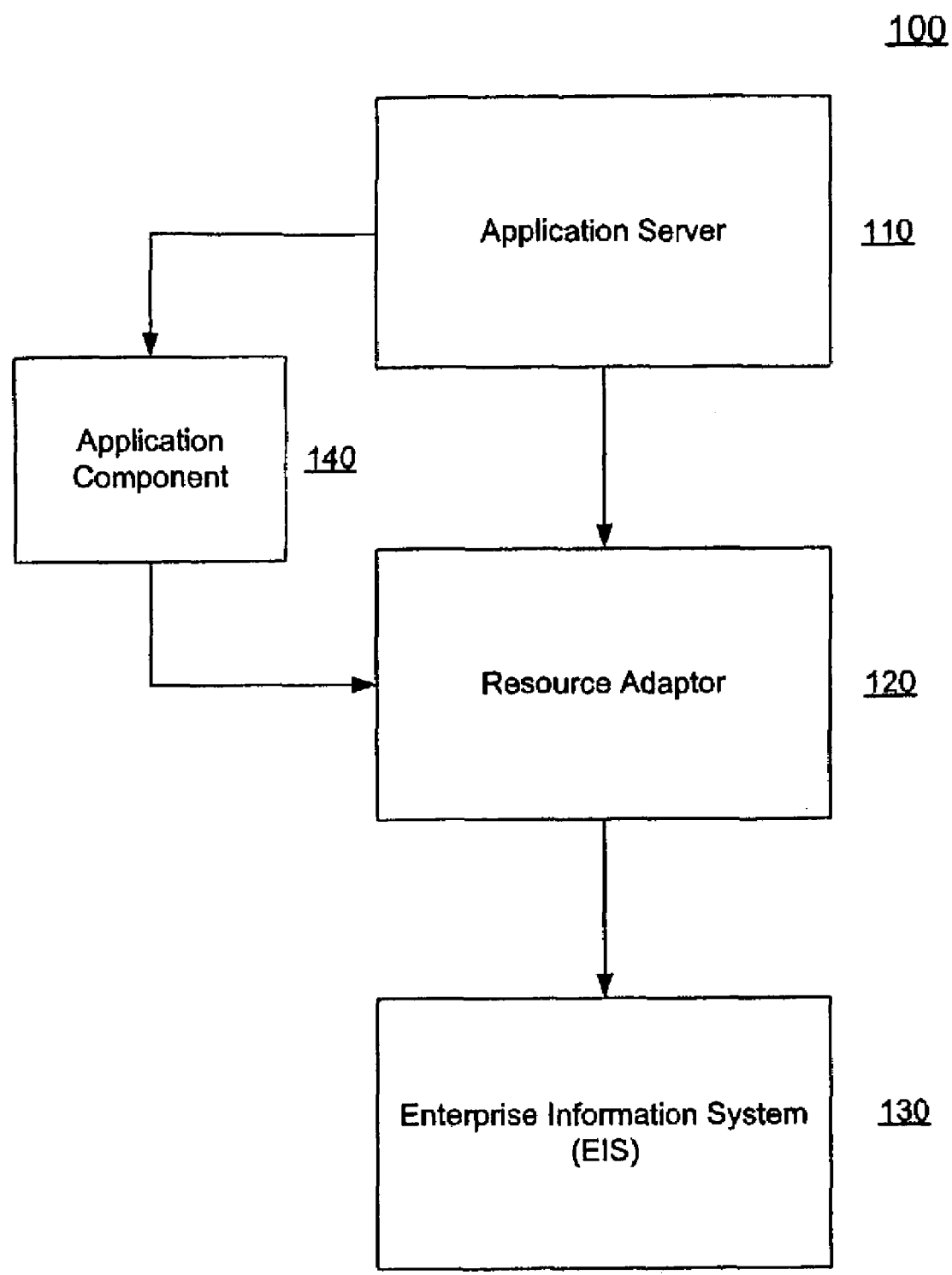
FIG. 1 is an illustration of a connector architecture in accordance with one embodiment of the present invention.

FIG. 1 is an illustration of a connector architecture implementation 100 in accordance with one embodiment of the present invention. Connector architecture implementation 100 includes application server 110, resource adapter 120, enterprise information system (EIS) 130, and application component 140. In one embodiment of the present invention, the connector architecture implementation is compatible with J2EE. The connector architecture implementation may be implemented in an application server and an EIS-specific resource adapter.

A resource adapter is a system level software driver used by an application server to connect to an EIS. A resource adapter may serve as a connector. Resource adapters contain the Java and any native components required for the application server to interact with the EIS. In one embodiment, the connector architecture of the present invention supports resource adapters developed by EIS vendors and third party application developers that can be deployed in any application server supporting the J2EE platform specification. An EIS provides the information infrastructure for an enterprise and offers a set of services to its clients. The services may be exposed to clients as local or remote interfaces, or both. An application component may be an EJB, JSP, or servlet that is deployed, managed, or executed on an application server.

The connector architecture implementation 100 of FIG. 1 further includes system level contracts. System level contracts exist between the resource adapter and the application server. The contracts may relate to connection management or other aspects of the connector architecture. Connection management contracts allow an application server the ability to provide a pool of connections to underlying EISs that enable application components to connect to an EIS. In one embodiment of the present invention, the connection management relates to connection pool configuration, connection pool management, and connection management.

In connector systems, multiple applications may attempt to establish a connection with the EIS. One connection pool holds all available managed connections to this EIS. Sometimes, after connecting to and using the services of an EIS, connector applications may not close the connection object. A connection object that is not closed after the application has completed using the connection object is considered a leaking connection.

Figure 2:
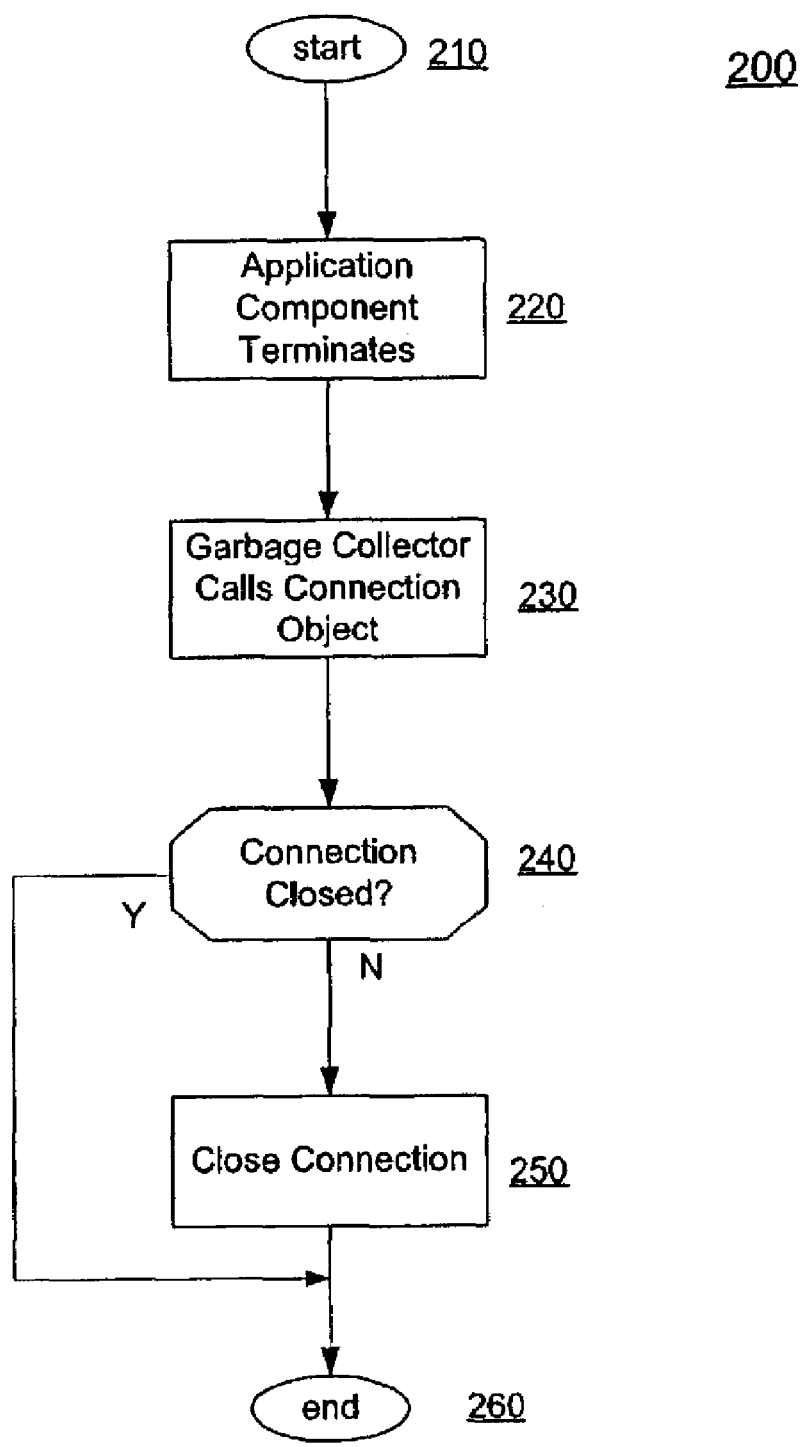
FIG. 2 is an illustration of a method for automatically detecting a connection leak in accordance with one embodiment of the present invention.

In one embodiment of the present invention, leak detection is performed automatically by leveraging the garbage collector. FIG. 2 illustrates a method 200 for detecting connection leaks automatically. Method 200 begins with start step 210. Next, an application component terminates in step 220. Once an application component terminates, the connection object used by the application component becomes de-referenced. After the application component terminates, the garbage collector calls a connection object in step 230. In one embodiment, the "finalize( )" method of a connection object is called by the garbage collector. Operation then continues to step 240. In one embodiment, the connector architecture implementation then determines if the application component closed the connection object at step 240. If the application component was determined to have closed the connection, or if the application server determines it is not safe to close the connection object, (for example, another application has a reference to the connection object), the method proceeds to end step 260. If the application component did not close the connection object and the application server confirms that it is safe, then the connection object is closed in step 250. In one embodiment, the server automatically closes the connection object in step 250. The server may close the connection object by calling the resource adapter's "ManagedConnection.cleanup( )" method. The application server then operates as it would have if it received a "ConnectionClosed" event upon a proper closure of the application component connection. After closing the connection object in step 250, the method ends in step 260.

In some instances, a leak detection system in addition to the automatic leak detection system is desirable. For example, the garbage collector may not call the finalize( ) method of the connection object used by the faulty application component. In this situation, additional leak detection methods would be useful for establishing increased connection management efficiency.

Figure 3:
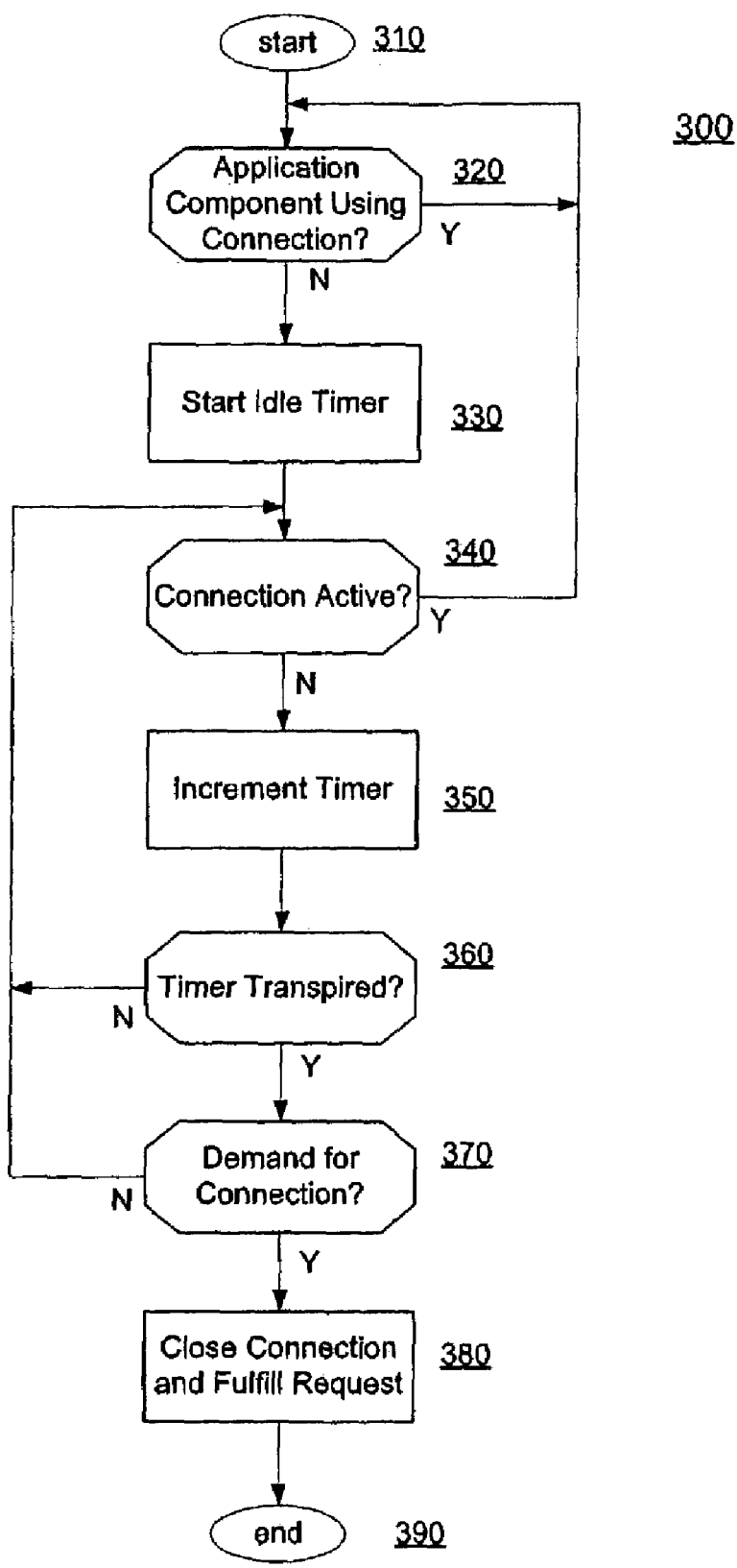
FIG. 3 is an illustration of a method for manually detecting a connection leak in accordance with one embodiment of the present invention.

The connector architecture implementation of the present invention also provides for a manual leak detection mechanism. The manual leak detection mechanism may be advantageous in detecting leaks when the garbage collector is unreliable and in the case of multiple connection object references. A method 300 for manual leak detection performed within the connector architecture of the present invention is shown in FIG. 3. Method 300 begins with start step 310. Next, in step 320 the connector architecture implementation determines whether the application component is actively using the connection it has requested. An active connection is a connection wherein an application component is currently using a requested connection object by calling methods on it or calling a request for a connection object request. If the application component connection is determined to be active, then operation returns to step 320. If an application component connection is determined to be inactive, operation continues to step 330. In step 330, a mechanism is triggered to monitor the time an application component connection is inactive. In one embodiment, the mechanism is a timer. The timer measures the last time a particular connection was active. In one embodiment, a timer may be configured to transpire in seconds for each connection associated with an EIS. In step 340, if an inactive connection becomes active while the timer transpires, operation continues to step 320. While the connection remains inactive, operation continues to step 350 and the timer continues to transpire. In step 360, it is determined whether or not the timer has reached a particular value. In one embodiment, the particular value is configured as a maximum idle time parameter. The maximum idle time parameter is a period of time in which after it has elapsed, the connection is considered expired. If the value of the timer is less then the maximum idle time parameter in step 360, operation continues to step 340. If the value of the timer has reached the maximum idle time parameter, then operation continues to step 370. In step 370, the connector architecture implementation determines if there is a demand for a managed connection. In one embodiment, a demand for a managed connection exists if the connection pool has reached a maximum capacity of managed connections and the connector architecture implementation receives a managed connection request. If either no connection request has been made or a connection request has been made but the connection pool may fulfill the request, then operation regarding the particular connection object request continues to step 340. If the connection pool has no available allocated connections and a connection request is made, operation continues to step 380. In step 380, the connector architecture implementation closes the connection object associated with the timer that has exceeded the maximum idle time parameter. The managed connection is now available to service connection requests. Operation of the manual leak detection system then ends in step 390.

Figure 4:
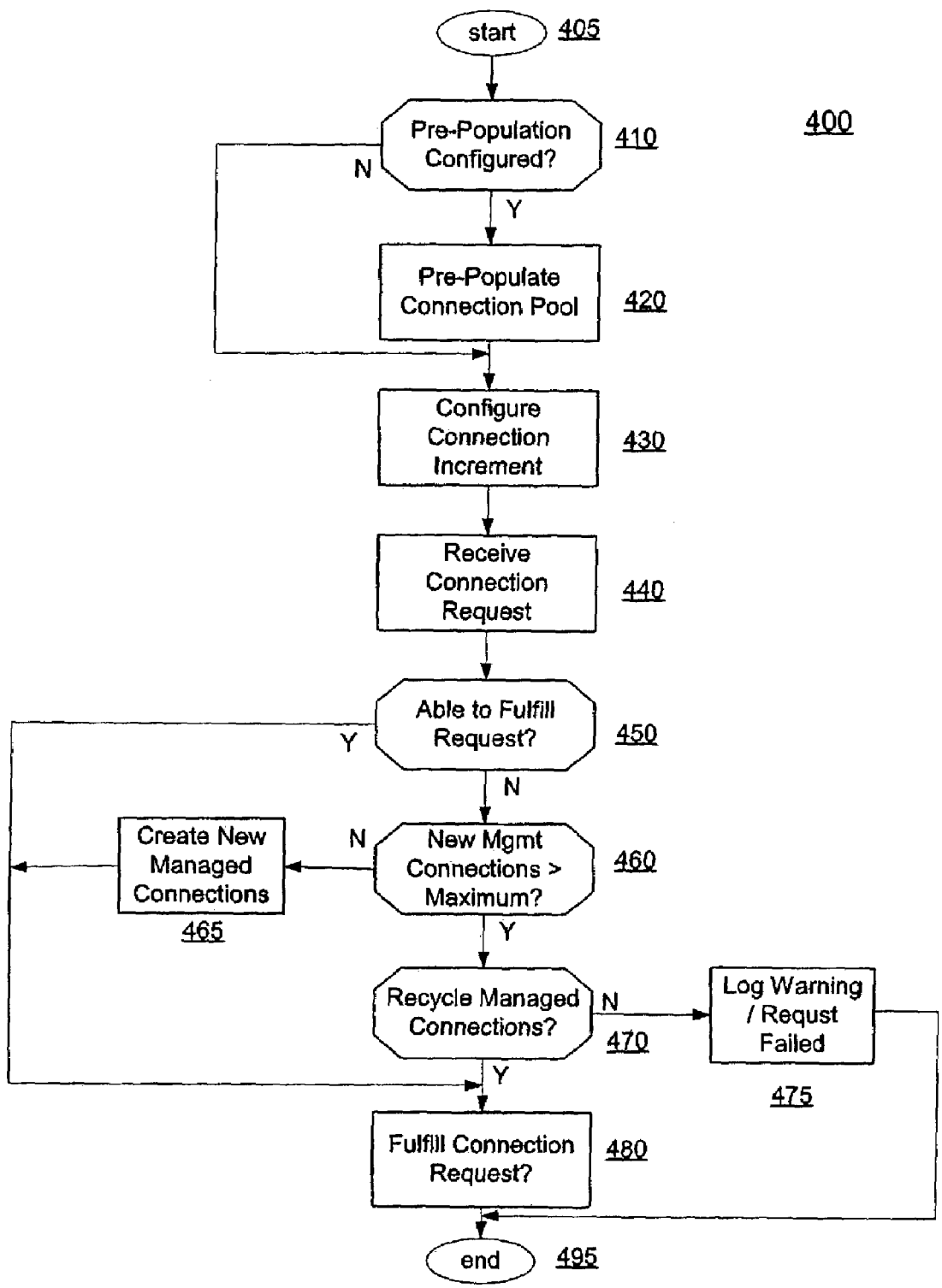
FIG. 4 is an illustration of a method for configuring a connection pool in accordance with one embodiment of the present invention.

In addition to detecting connection leaks, the connector architecture implementation of the present invention may configure a connection pool for an EIS to aid in fulfilling connection requests. In one embodiment, the connection pool can be configured for pre-population. Pre-populating the connection pool with an initial number of managed connections is done upon startup of the application server and connector architecture implementation of the present invention. This pre-population prevents experiencing a decrease in performance when the managed connections are later created upon request. FIG. 4 illustrates a method 400 for configuring a connection pool in accordance with one embodiment of the present invention. Method 400 begins with start step 405. Next, the connector architecture implementation of the present invention determines whether or not an EIS is configured in such a manner as to pre-populate the connection pool associated with the EIS with an initial number of managed connections. If the connection pool is not to be pre-populated, then operation continues to step 430. If pre-population is to occur, then operation continues to step 420. In step 420, the connection pool is populated with managed connections. In one embodiment, the number of managed connections used to pre-populate a connection pool may be configured by a pre-population parameter. The parameter is specific to a particular connection pool associated with the resource adapter. In one embodiment of the present invention, the pre-population parameter is an initial-capacity element, located in an XML formatted descriptor file of the connector architecture implementation of the present invention. The initial capacity element specifies how many managed connections a connection pool should be pre-populated with at the deployment of a resource adapter with the application server. In one embodiment of the present invention, pre-population of managed connections may not be done where runtime parameters are required.

A connection increment parameter is then configured in step 430. The connection increment parameter represents the number of managed connections that are created at the time a connection request is made. The connection increment parameter allows a user to control the connection pool growth and when to incur the performance and processing costs of connection pool growth. In one embodiment, the connection increment parameter is a capacity-increment element located in an XML formatted descriptor file of the connector architecture implementation of the present invention.

A connection request is then received in step 440. In one embodiment, a connection request may involve an application component requesting a connection object to an EIS through the resource adapter. Once a connection request is received, the connector architecture implementation determines whether the request may be fulfilled with existing available managed connections in step 450. If the connection request can be fulfilled, then operation continues to step 480. If the connection request can not be fulfilled with existing and available managed connections, the operation continues to step 460.

In step 460, it is determined whether creating a new managed connection will exceed a maximum allowed number of managed connections. In one embodiment, the maximum number of allowed connections is determined by a maximum-capacity element located in an XML formatted descriptor file of the connector architecture implementation of the present invention. The maximum number of managed connections may be configured for a single EIS. In one embodiment, more than one managed connection may be created when a connection request is received and no available managed connections exist. In particular, the number of managed connections created may correspond to the capacity-increment parameter. Thus, if the connection increment parameter has a value of three, then the connector architecture implementation will attempt to add three managed connections if a connection request can not be fulfilled by existing and available managed connections. In any case, if adding managed connections in the amount of the connection increment parameter does not bring the number of managed connections associated with an EIS over the maximum managed connections allowed for that EIS, then operation continues to step 465 where the new managed connections are created within the connection pool. If adding the new managed connections does bring the number of managed connections over the maximum allowed for an EIS, then operation continues to step 470.

The connection architecture implementation determines whether or not managed connections can be recycled in step 470. In one embodiment, recycling includes terminating connection objects that are determined to be inactive. The connector architecture implementation may determine a connection object is inactive according to the method 300 for manually detecting connection leaks as illustrated in FIG. 3 and discussed above. In particular, in step 370, if it is determined that the timer associated with a connection has transpired and a connection request is received in step 370, then the connection object will be closed in step 380 and recycled for use in step 470. If no connection objects exist that can be recycled, then operation continues to step 475 where a warning is logged and the connection request fails. If existing connection objects may be recycled to meet the connection request, the connection request is fulfilled in step 480. Operation then ends in step 495.

Figure 5:
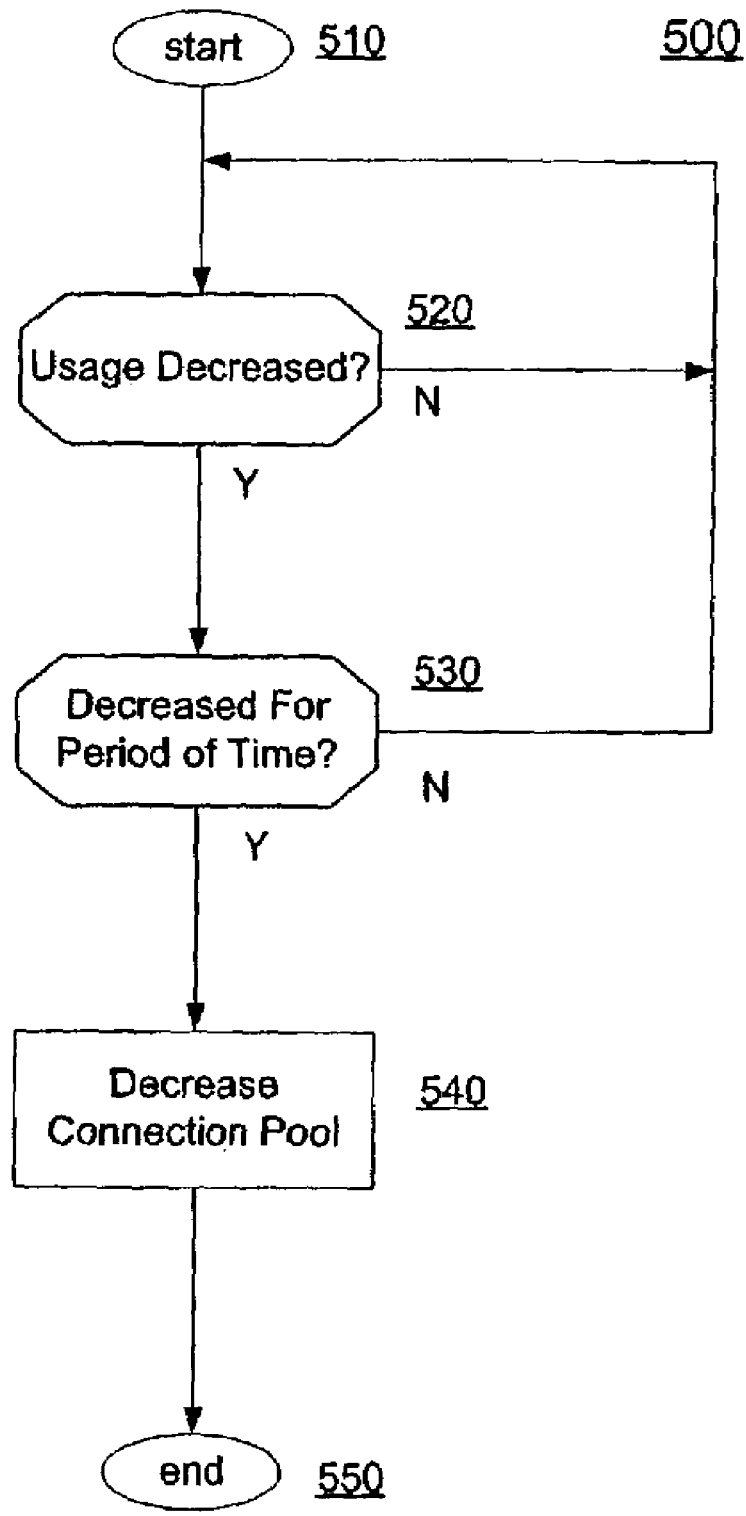
FIG. 5 is an illustration of a method for controlling connection pool shrinkage in accordance with one embodiment of the present invention.

In addition to managing the growth of a connection pool, the connector architecture implementation of the present invention can manage the reduction of the connection pool. In one embodiment of the present invention, the connector architecture implementation may monitor the managed connection usage and reduce the size of the connection pool if the usage has decreased. A method 500 for reducing the number of managed connections in accordance with one embodiment of the present invention is illustrated in FIG. 5. Method 500 begins with start step 510. Next, the connector architecture implementation of the present invention determines whether managed connection usage has decreased in step 520. If the managed connection usage has decreased through the use of fewer managed connections or in some other manner, then operation continues to step 530. If the managed connection usage has not decreased, then operation returns to step 520. In step 530, the connector architecture implementation determines if the managed connection usage decrease has existed for a specified period of time. In one embodiment of the present invention, the period of time may be configured as a parameter in the shrink-period-minutes element located in an XML formatted descriptor file of the connector architecture implementation. The period of time is associated with a single connection pool associated with the resource adapter. If the usage decrease has not existed for the specified period of time, then operation returns to step 520. If the usage decrease has existed for the specified period of time, operation continues to step 540. The size of the connection pool is decreased in step 540. In one embodiment, at least one managed connection is closed to reduce the size of the connection pool. The connector architecture implementation may close a number of managed connections to establish a number of managed connections to efficiently satisfy ongoing connection requests in one embodiment, connection object usage is monitored by taking "snapshots" of connection object usage at intervals of time, the snapshots triggered by a monitor timer. When shrinking is detected as a result of a comparison of the snapshots, or if the connector architecture determines shrinking should occur, the connection pool is reduced to the higher of the initial-capacity of the pool or the average usage level. In one embodiment, the method for reduction of the connection pool may be enabled or disabled by the user. In one embodiment, reduction of the connection pool may be enabled by configuring a shrinking-enabled element located in an XML formatted descriptor file of the connector architecture implementation.

Figure 6:
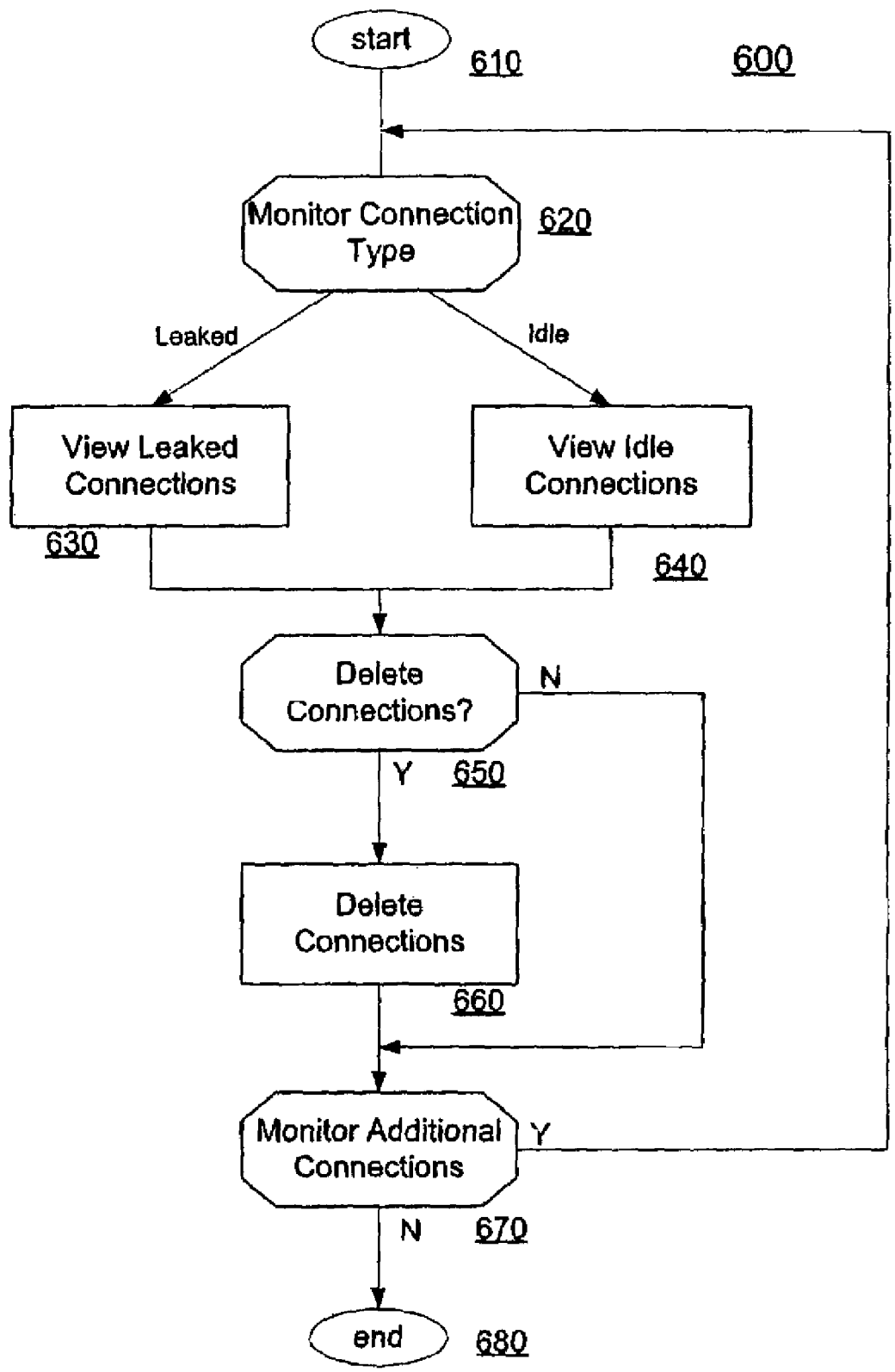
FIG. 6 is an illustration of a method for monitoring connections in accordance with one embodiment of the present invention.

The connector architecture implementation may also provide for monitoring of managed connections. In one embodiment of the present invention, a user may view and monitor managed connections. Types of managed connections to view and monitor may include leaked and idle connections. In one embodiment of the present invention, a connection-profiling-enabled element located in an XML formatted descriptor file of the connector architecture implementation indicates whether a connection pool should store the call stacks of where each connection is allocated. In one embodiment, if the connection-profiling-enabled element is configured to be true, the stacks for leaked, and idle connections can be viewed and a user may debug components that fail to close connection objects. A method 600 for monitoring of connections in accordance with one embodiment of the present invention is illustrated in FIG. 6. Method 600 begins with start step 610. Next, a user may choose between viewing information regarding and monitoring leaked connections and idle connections. If leaked connections are to be viewed, then operation continues to step 630. In step 630, a user may view information regarding leaked connections. The leaked connection information may be displayed through a console, a log window, or some other manner. The leaked connection information may include run time information of leaked connections, profile information. In one embodiment, profile information displayed includes dates from the call stack of the connection object usage. This data helps the administrator determine which application or application component caused the leak. If idle connections are to be viewed, then operation continues to step 640. In step 640, idle information such as profile information for idle connections may be viewed by a user. After viewing connection information in steps 630 or 640, a user may then decide to delete a connection object in step 650. In one embodiment, a leaked connection object may be deleted if the connection object has exceeded a specified idle time and is not involved in a transaction. If no connection is to be deleted, then operation continues to step 670. If a connection object is to be deleted, then operation continues to step 660 where the connection object is deleted. Next, operation continues to step 670 where a user may view more connections or end the monitoring of managed connections. If a user wishes to further monitor managed connections, operation continues to step 620. If no further monitoring of managed connections is to occur, operation ends at step 680.

Figure 7:
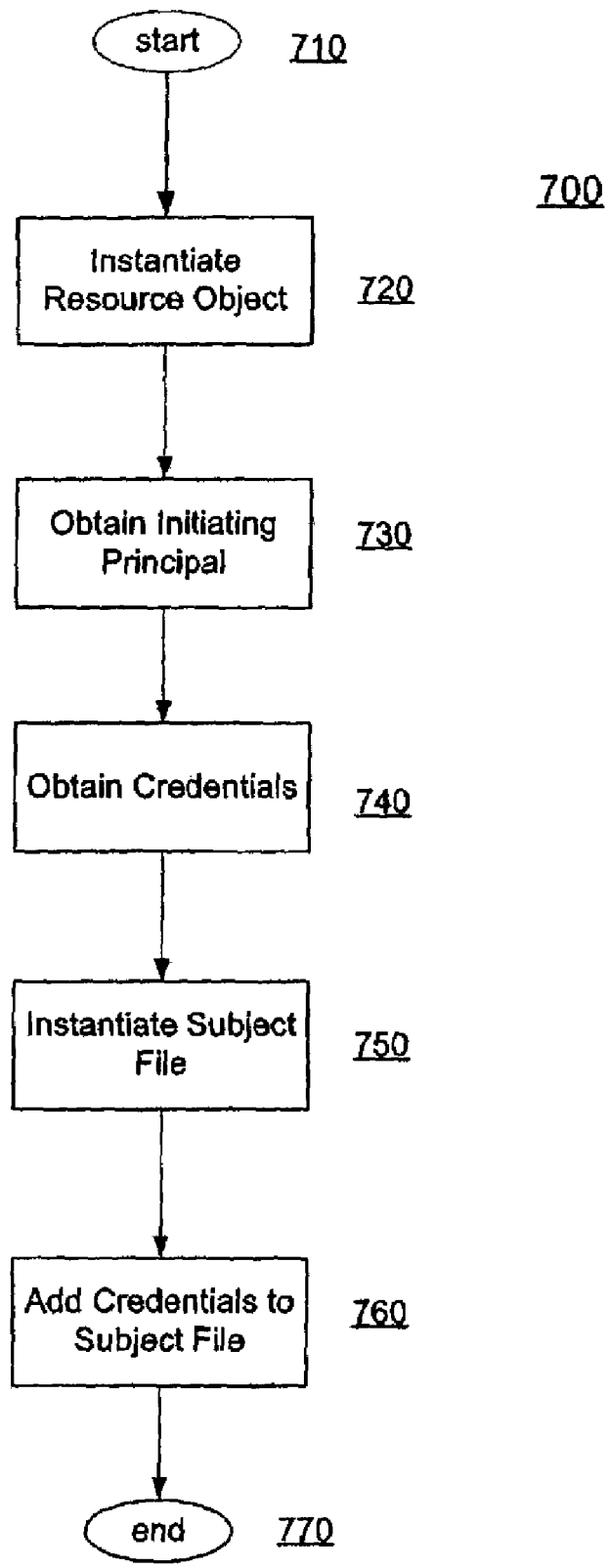
FIG. 7 is an illustration of a method for storing credentials in accordance with one embodiment of the present invention.

The connector architecture implementation provides security management. In one embodiment of the present invention, credentials are stored in a javax.securtiy.auth.Subject object to comply with Sun's J2EE Connector Specification, version 1.0 final release. A method 700 for storing credentials in accordance with one embodiment of the present invention is shown in FIG. 7. Method 700 begins with start step 710. Next, an EIS resource object is instantiated in step 710. In one embodiment, a weblogic.security.Service.EISResource object is instantiated with the following command: new EISResource(java.lang.String applicationName, java.lang.String moduleName, java.lang.String eisName). The command is executed from the security management code of the WebLogic Server. Next, the initiating principal for the connection request is obtained in step 730. In one embodiment, the initiating principal is obtained by querying the WebLogic Server security code for the user initiated principal associated with the application component making the connection request. Then, credentials for the initiating principal are obtained in step 740. In one embodiment, the credentials are obtained with the following command: weblogic.security.Service.PrincipalAuthenticator(String initiatingPrincipal, weblogic.security.Service.Resource eisResource). A Subject file is then instantiated in step 750. In one embodiment, the file is a javax.security.auth.Subject. Then, credentials are added to the subject file in step 760. In one embodiment, the credentials are added to the private set in the credentials with the following command:Subject.getPrivateCredentials( ).add (Credential). The Subject file is then completed and method 700 ends at step 770.

The connector architecture implementation of the present invention is provided that is J2EE compliant and provides improved connection management capabilities. In one embodiment of the present invention, the connector architecture implementation provides a connector leak detection mechanism. The connector leak detector may detect connection leaks both automatically and manually. In another embodiment of the present invention, the connector architecture implementation is operable to pre-configure a connection pool and manage the growth and reduction of a connection pool. The connector architecture may be pre-configured by pre-populating the connection pool. Connection pool growth may be managed by connections that are created in response to connection requests. A connection pool in the present invention may also be configured to reduce the number of connections in the pool. In one embodiment, the number of connections is reduced if the connection demand decreases. Password credentials allowing access to services are used to provide additional connection management.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the methods of the present invention.

Included in the programming (software) of the general/specialized computer or microprocessor are software modules for implementing the teachings of the present invention, including, but not limited to, a connector architecture implementation according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A computer implemented method comprising:
    providing a connection in a pool of connections to enable an application component to connect to an Enterprise Information System (EIS), wherein the application component executes on a web application server that complies with the J2EE Connector Architecture (JCA);
    measuring, with a timer, a last time that the connection was active;
    determining whether the connection has reached a maximum idle time, wherein the maximum idle time is configured in a maximum idle time parameter;
    if a value measured by the timer has reached the maximum idle time, considering the connection an expired connection;
    receiving a connection request from an application component deployed on the web application server for a new connection;
    determining that there are no free connections in the pool of connections and that the pool of connections has reached a maximum capacity;
    subsequent to receiving the request for the new connection and determining that there are no free connections and that the pool has reached the maximum capacity, recycling the expired connection to free the expired connection;
    assigning the connection that was freed to the application component that requested the new connection;
    terminating the application component that was associated with the connection, wherein the connection is de-referenced and a finalize method associated with the connection is called;
    if the application component does not close the connection, determining whether another entity has a reference to the connection;
    if the application server determines that no other entities have references to the connection, closing the connection and designating the connection as a leaked connection; and
    profiling the leaked connection by rendering a call stack, wherein the call stack of the leaked connection provides information for determining which application failed to close the connection, wherein a connection profiling enabled element located in an XML formatted descriptor file indicates whether the pool of connections stores call stacks of where each connection is allocated.

2. The computer-implemented method of claim 1, further comprising:
    terminating the application component that was associated with the connection, wherein the connection is de-referenced and a garbage collector calls a finalize method associated with the connection;
    if the application component does not close the connection, determining whether it is safe for the application server to close the connection; and
    if the application server determines that it is safe to close the connection, closing the connection.

3. The computer-implemented method of claim 1, further comprising displaying a call stack of the connection, wherein the call stack of the connection can be used to debug the application component if the application component fails to close the connection.

4. The computer-implemented method of claim 3, wherein displaying the call stack includes dates from call stacks of the connection.

5. The computer-implemented method of claim 1, further comprising monitoring stacks for active, leaked, and idle connections.

6. The computer-implemented method of claim 1, wherein recycling the expired connection includes terminating the expired connection after the expired connection is determined to be inactive.

7. The computer-implemented method of claim 1, wherein a connection that is not closed after an application component has completed using the connection is considered a leaked connection.

8. A computer-implemented system for detecting connection leaks, comprising:
    a processor;
    an application server that complies with the J2EE Connector Architecture (JCA);
    an application component, executable by the processor;
    a resource adapter to enable communication from the application server to an enterprise information server (EIS);
    a pool of connections, managed by the application server, to enable the application component to connect to the EIS;
    a garbage collector to recycle connection leaks, wherein after the application component terminates and a connection associated with the application component becomes de-referenced, the garbage collector calls a finalize method associated with the connection, wherein after the garbage collector calls the finalize method, if the application component has not closed the connection, determining whether another entity has a reference to the connection, and if the application server determines that no other entities have references to the connection, closing the connection and designating the connection as a leaked connection;
    a call stack that profiles the leaked connection, wherein the call stack of the leaked connection provides information for determining which application failed to close the connection, wherein a connection profiling enabled element located in an XML formatted descriptor file indicates whether the pool of connections stores call stacks of where each connection is allocated; and an idle timer that allows the application server to measure a last time each connection was active, wherein if a value measured by the timer has reached the maximum idle time, considering the connection an expired connection, if an application component makes a request for a new connection, and it is determined that there are no available allocated connections and the pool of connections is at maximum size, the application server frees the expired connection and assigns the connection that was freed to the application component.

9. The computer-implemented system of claim 8, wherein the application server closes the connection by calling a method associated with the resource adapter.

10. The computer-implemented system of claim 8, wherein the connection is active if the application component is currently using the connection by calling methods on the connection or the application component is calling a request for a new connection.

11. The computer-implemented system of claim 8, wherein a connection that is not closed after an application component has completed using the connection is considered a leaked connection.

12. A computer-readable storage medium, including instructions stored thereon which when read and executed by a computer cause the computer to perform steps comprising:

measuring, with a timer, a last time that a connection was active;

determining whether the connection has reached a maximum idle time, wherein the maximum idle time is configured in a maximum idle time parameter;

if a value measured by the timer has reached the maximum idle time, considering the connection an expired connection;

receiving a request, from an application component, for a new connection;

determining that there are no free connections in a pool of connections and that the pool of connections has reached a maximum capacity;

subsequent to receiving the request for the connection and determining that there are no free connections and that the pool has reached the maximum capacity, recycling the expired connection to free the connection;

assigning the connection that was freed to the application component that requested the new connection;

terminating the application component that was associated with the connection, wherein the connection is de-referenced and a finalize method associated with the connection is called;

if the application component does not close the connection, determining whether another entity has a reference to the connection;

if the application server determines that no other entities have references to the connection, closing the connection and designating the connection as a leaked connection; and profiling the leaked connection by rendering a call stack, wherein the call stack of the leaked connection provides information for determining which application failed to close the connection, wherein a connection profiling enabled element located in an XML formatted descriptor file indicates whether the pool of connections stores call stacks of where each connection is allocated.

13. The computer-readable storage medium of claim 12, further comprising:

terminating the application component that was associated with the connection, wherein the connection becomes de-referenced and a garbage collector calls a finalize method associated with the connection;

if the application does not close the connection, determining whether it is safe for the application server to close the connection; and if the application server determines that it is safe to close the connection, closing the connection.

14. The computer-readable storage medium of claim 12, wherein recycling the expired connection includes terminating the expired connection after the expired connection is determined to be inactive.

15. The computer-readable storage medium of claim 12, wherein the application server closes the connection by calling a method associated with a resource adapter.

16. The computer-readable storage medium of claim 12, wherein the connection is active if the application component is currently using the connection by calling methods on the connection or the application component is calling a request for a new connection.

17. The computer-readable storage medium of claim 12, wherein a connection that is not closed after an application component has completed using the connection is considered a leaked connection.

* * * * *

UNITED STATES PATENT AND TRADEMARK OFFICE
CERTIFICATE OF CORRECTION

| | | |
|---|---|---|
| PATENT NO. | : 7,698,434 B2 | |
| APPLICATION NO. | : 10/248744 | |
| DATED | : April 13, 2010 | |
| INVENTOR(S) | : June et al. | |

It is certified that error appears in the above-identified patent and that said Letters Patent is hereby corrected as shown below:

Title page, Item (56)
On page 2, under "Other Publications", in column 2, line 3, delete "Techonology," and insert -- Technology, --, therefor.

On page 2, under "Other Publications", in column 2, line 21, delete "Environmens," and insert -- Environments, --, therefor.

Signed and Sealed this
Eighth Day of March, 2011

David J. Kappos
*Director of the United States Patent and Trademark Office*